US007164095B2

(12) United States Patent
Lee et al.

(10) Patent No.: US 7,164,095 B2
(45) Date of Patent: Jan. 16, 2007

(54) MICROWAVE PLASMA NOZZLE WITH ENHANCED PLUME STABILITY AND HEATING EFFICIENCY

(75) Inventors: Sang Hun Lee, Austin, TX (US); Jay Joongsoo Kim, San Jose, CA (US)

(73) Assignees: Noritsu Koki Co., Ltd., Wakayama (JP); Amarante Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/885,237

(22) Filed: Jul. 7, 2004

(65) Prior Publication Data

US 2006/0006153 A1 Jan. 12, 2006

(51) Int. Cl.
*B23K 10/00* (2006.01)

(52) U.S. Cl. .......................... 219/121.5; 118/723 MW

(58) Field of Classification Search ............ 219/121.5, 219/121.48, 121.47, 121.43, 121.41, 121.52, 219/121.51, 76.16; 118/723 ME, 723 MW, 118/719; 427/446, 508, 509
See application file for complete search history.

(56) References Cited

U.S. PATENT DOCUMENTS 3,353,060 A * 11/1967 Yamamoto et al. ..... 315/111.31
3,562,486 A * 2/1971 Hatch et al. ........... 219/121.45
4,207,286 A 6/1980 Gut Boucher
4,976,920 A 12/1990 Jacob
5,084,239 A 1/1992 Moulton et al.
5,170,098 A 12/1992 Dutton et al.
5,503,676 A 4/1996 Shufflebotham et al.
5,573,682 A 11/1996 Beason, Jr. et al.
5,741,460 A 4/1998 Jacob et al.
5,750,072 A 5/1998 Sangster et al.
5,825,485 A 10/1998 Cohn et al.
5,869,401 A 2/1999 Brunemeier et al.
5,928,527 A 7/1999 Li et al.
5,938,854 A 8/1999 Roth
5,961,921 A 10/1999 Addy et al.

(Continued)

FOREIGN PATENT DOCUMENTS

DE 44 08 301 A 9/1994

(Continued)

OTHER PUBLICATIONS

K. Kelly-W et al., "Room Temperature Sterilization of Surfaces and Fabrics With a One Atmosphere Uniform Glow Discharge Plasma", Journal of Industrial Microbiology & Biotechnology, 1998, pp. 69-74, vol. 20, Society for Industrial & Microbiology.

(Continued)

*Primary Examiner*—Quang Van
(74) *Attorney, Agent, or Firm*—Smith Patent Office

(57) ABSTRACT

Systems and methods for generating relatively cool microwave plasma. The present invention provides a microwave plasma nozzle that includes a gas flow tube through which a gas flows, and a rod-shaped conductor that is disposed in the gas flow tube and has a tapered tip near the outlet of the gas flow tube. A portion of the rod-shaped conductor extends into a microwave cavity to receive microwaves passing in the cavity. These received microwaves are focused at the tapered tip to heat the gas into plasma. The microwave plasma nozzle also includes a vortex guide between the rod-shaped conductor and the gas flow tube imparting a helical shaped flow direction around the rod-shaped conductor to the gas flowing through the tube. The microwave plasma nozzle further includes a mechanism for electronically exciting the gas and a shielding mechanism for reducing a microwave power loss through the gas flow tube.

38 Claims, 6 Drawing Sheets

U.S. PATENT DOCUMENTS

| | | | | |
|---|---|---|---|---|
| 5,977,715 | A | 11/1999 | Li et al. | |
| 5,980,768 | A | 11/1999 | Abraham | |
| 5,990,446 | A * | 11/1999 | Zhang et al. | 219/137 PS |
| 6,016,766 | A | 1/2000 | Pirkle et al. | |
| 6,017,825 | A | 1/2000 | Kim et al. | |
| 6,030,579 | A | 2/2000 | Addy et al. | |
| 6,068,817 | A | 5/2000 | Addy et al. | |
| 6,080,270 | A * | 6/2000 | Tabrez et al. | 156/345.36 |
| 6,165,910 | A | 12/2000 | Flanner et al. | |
| 6,170,668 | B1 | 1/2001 | Babko-Malyi | |
| 6,200,651 | B1 | 3/2001 | Roche et al. | |
| 6,209,551 | B1 | 4/2001 | Yang et al. | |
| 6,221,268 | B1 | 4/2001 | Li et al. | |
| 6,221,792 | B1 | 4/2001 | Yang et al. | |
| 6,225,593 | B1 | 5/2001 | Howieson et al. | |
| 6,228,330 | B1 | 5/2001 | Herrmann et al. | |
| 6,235,640 | B1 | 5/2001 | Ebel et al. | |
| 6,309,979 | B1 | 10/2001 | Patrick et al. | |
| 6,337,277 | B1 | 1/2002 | Chou et al. | |
| 6,363,882 | B1 | 4/2002 | Hao et al. | |
| 6,410,451 | B1 | 6/2002 | Nguyen et al. | |
| 6,441,554 | B1 | 8/2002 | Nam et al. | |
| 6,573,731 | B1 | 6/2003 | Verdeyen et al. | |
| 6,677,550 | B1 | 1/2004 | Fornsel et al. | |
| 6,727,148 | B1 | 4/2004 | Setton | |
| 6,792,742 | B1 | 9/2004 | Ekkert | |
| 2004/0182834 | A1* | 9/2004 | Kamarehi | 219/121.43 |
| 2004/0262268 | A1* | 12/2004 | Wu | 219/121.36 |

FOREIGN PATENT DOCUMENTS

| | | | |
|---|---|---|---|
| DE | 101 64 120 | A | 7/2003 |
| JP | 43-24312 | B | 10/1968 |
| JP | 63-50478 | A | 3/1988 |
| JP | 03-70375 | A | 3/1991 |
| JP | 03-241739 | A | 10/1991 |
| JP | 05-82449 | A | 4/1993 |
| JP | 05-275191 | A | 10/1993 |
| JP | 06-5384 | A | 1/1994 |
| JP | 06-263120 | A | 9/1994 |
| JP | 07-40056 | A | 2/1995 |
| JP | 07-153593 | A | 6/1995 |
| JP | 08-508362 | A | 9/1996 |
| JP | 08-319553 | A | 12/1996 |
| JP | 11-8093 | A | 1/1999 |
| JP | 11-21496 | A | 1/1999 |
| JP | 11086779 | A * | 3/1999 |
| JP | 11-224795 | A | 8/1999 |
| JP | 2000-150484 | A | 5/2000 |
| JP | 2000-353689 | A | 12/2000 |
| JP | 2001-54556 | A | 2/2001 |
| JP | 2001-512341 | A | 8/2001 |
| JP | 2001-281284 | A | 10/2001 |
| JP | 2003-135571 | A | 5/2003 |
| JP | 2003-518317 | A | 6/2003 |
| JP | 2003-210556 | A | 7/2003 |
| JP | 2004-45262 | A | 12/2004 |
| WO | WO 98/35618 | A | 8/1998 |
| WO | WO 99/04606 | A | 1/1999 |
| WO | WO 01/06268 | A | 1/2001 |
| WO | WO 01/06402 | A | 1/2001 |
| WO | WO 01/43512 | A | 6/2001 |

OTHER PUBLICATIONS

T. Wu et al., "A Large-Area Plasma Source Excited by a Tunable Surface Wave Cavity", Review of Scientific Instruments, May 1999, pp. 2331-2337, vol. 70, No. 5, American Institute of Physics.

K. Kelly-W et al., "Use of a One Atmosphere Uniform Glow Discharge Plasma to Kill a Broad Spectrum of Microorganisms", Journal of Vacuum Science Technology, Jul./Aug. 1999, pp. 1539-1544, vol. 17 No. 4, American Vacuum Society.

I. Sorosnenko et al., "Sterilization of Medical Products in Low-Pressure Glow Discharges", Plasma Physics Reports, 2000, pp. 792-800, vol. 26, No. 9, MAIK "Nauka/Interperiodica".

J. Gerling, "Waveguide Components and Configurations for Optimal Performance in Microwave Hearing Systems", 2000, pp. 1-8, Gerling Applied Engineering, Inc.

P. Woskov et al., "Large Electrodless Plasmas at Atmospheric Pressure Sustained by a Microwave Waveguide", Plasma Science and Fusion Center, Massachusetts Institute of Technology, Jan. 2002, pp. 1-8, to be published in IEEE Transactions on Plasma Science.

S. Moon et al., "Characteristics of an Atmospheric Microwave-Induced Plasma Generated in Ambient Air by an Argon Discharge Excited in an Open-Ended Dielectric Discharge Tube", Physics of Plasmas, Sep. 2002, pp. 4045-4051, vol. 9, No. 9, American Institute of Physics.

J. Gerling, "Equipment and Methods for Waveguide Power Measurements in Microwave Heating Applications", 2002, pp. 1-8, Gerling Applied Engineering, Inc.

C. Kuruger et al., "Nonequilibrium Discharges in Air and Nitrogen Plasmas at Atmospheric Pressure", Pure Applied Chemistry, 2002, pp. 337-247, vol. 74, No. 3, IUPAC.

D. Korzec et al., "Free-Standing Microwave Excited Plasma Beam", Plasma Sources Science and Technology, Aug. 2003, pp. 523-532, vol. 12, Institute of Physics Publishing.

B. Park et al., "Sterilization Using a Microwave-Induced Argon Plasma System at Atmospheric Pressure", Physics of Plasmas, Nov. 2003, pp. 4539-4544, vol. 10, No. 11, American Institute of Physics.

V. Khomich et al., "Investigation of Principal Factors of the Sterilization by Plasma DC Glow Discharge", Institute of Physics NAS Ukraine, Ukraine.

* cited by examiner

MICROWAVE PLASMA NOZZLE WITH ENHANCED PLUME STABILITY AND HEATING EFFICIENCY

BACKGROUND OF THE INVENTION

1. Field of the Invention

The present invention relates to plasma generators, and more particularly to devices having a nozzle that discharges a plasma plume which can be generated using microwaves.

2. Discussion of the Related Art

In recent years, the progress on producing plasma has been increasing. Typically, plasma consists of positive charged ions, neutral species and electrons. In general, plasmas may be subdivided into two categories: thermal equilibrium and thermal non-equilibrium plasmas. Thermal equilibrium implies that the temperature of all species including positive charged ions, neutral species, and electrons, is the same.

Plasmas may also be classified into local thermal equilibrium (LTE) and non-LTE plasmas, where this subdivision is typically related to the pressure of the plasmas. The term "local thermal equilibrium (LTE)" refers to a thermodynamic state where the temperatures of all of the plasma species are the same in the localized areas in the plasma.

A high plasma pressure induces a large number of collisions per unit time interval in the plasma, leading to sufficient energy exchange between the species comprising the plasma, and this leads to an equal temperature for the plasma species. A low plasma pressure, on the other hand, may yield one or more temperatures for the plasma species due to insufficient collisions between the species of the plasma.

In non-LTE, or simply non-thermal plasmas, the temperature of the ions and the neutral species is usually less than 100° C., while the temperature of electrons can be up to several tens of thousand degrees in Celsius. Therefore, non-LTE plasma may serve as highly reactive tools for powerful and also gentle applications without consuming a large amount of energy. This "hot coolness" allows a variety of processing possibilities and economic opportunities for various applications. Powerful applications include metal deposition system and plasma cutters, and gentle applications include plasma surface cleaning systems and plasma displays.

One of these applications is plasma sterilization, which uses plasma to destroy microbial life, including highly resistant bacterial endospores. Sterilization is a critical step in ensuring the safety of medical and dental devices, materials, and fabrics for final use. Existing sterilization methods used in hospitals and industries include autoclaving, ethylene oxide gas (EtO), dry heat, and irradiation by gamma rays or electron beams. These technologies have a number of problems that must be dealt with and overcome and these include issues as thermal sensitivity and destruction by heat, the formation of toxic byproducts, the high cost of operation, and the inefficiencies in the overall cycle duration. Consequently, healthcare agencies and industries have long needed a sterilizing technique that could function near room temperature and with much shorter times without inducing structural damage to a wide range of medical materials including various heat sensitive electronic components and equipment.

These changes to new medical materials and devices have made sterilization very challenging using traditional sterilization methods. One approach has been using a low pressure plasma (or equivalently, a below-atmospheric pressure plasma) generated from hydrogen peroxide. However, due to the complexity and the high operational costs of the batch process units needed for this process, hospitals use of this technique has been limited to very specific applications. Also, low pressure plasma systems generate plasmas having radicals that are mostly responsible for detoxification and partial sterilization, and this has negative effects on the operational efficiency of the process.

It is also possible to generate an atmospheric plasma such as for treating surfaces, such as pre-treatment of plastic surfaces. One method of generating an atmospheric plasma is taught by U.S. Pat. No. 6,677,550 (Förnsel et al.). Förnsel et al. disclose a plasma nozzle in FIG. 1, where a high-frequency generator applies high voltage between a pin-shaped electrode 18 and a tubular conducting housing 10. Consequently, an electric discharge is established therebetween as a heating mechanism. Förnsel et al. as well as the other existing systems that use a high voltage AC or a Pulsed DC to induce an arc within a nozzle and/or an electric discharge to form a plasma has various efficiency drawbacks. This is because the initial plasma is generated inside the nozzle and it is guided by the narrow slits. This arrangement allows some of the active radicals to be lost inside the nozzle. It also has other problems in that this nozzle design has a high power consumption and produces a high temperature plasma.

Another method of generating an atmospheric plasma is described in U.S. Pat. No. 3,353,060 (Yamamoto et al.). Yamamoto et al disclose a high frequency discharge plasma generator where high frequency power is supplied into an appropriate discharge gas stream to cause high-frequency discharge within this gas stream. This produces a plasma flame of ionized gas at an extremely high temperature. Yamamoto et al. uses a retractable conductor rod 30 and the associated components shown in FIG. 3 to initiate plasma using a complicated mechanism. Yamamoto et al. also includes a coaxial waveguide 3 that is a conductor and forms a high-frequency power transmission path. Another drawback of this design is that the temperature of ions and neutral species in the plasma ranges from 5,000 to 10,000° C., which is not useful for sterilization since these temperatures can easily damage the articles to be sterilized.

Using microwaves is one of the conventional methods for generating plasma. However, existing microwave techniques generate plasmas that are not suitable, or at best, highly inefficient for sterilization due to one or more of the following drawbacks: their high plasma temperature, a low energy field of the plasma, a high operational cost, a lengthy turnaround time for sterilization, a high initial cost for the device, or they use a low pressure (typically below atmospheric pressure) using vacuum systems. Thus, there is a need for a sterilization system that: 1) is cheaper than currently available sterilization systems, 2) uses nozzles that generate a relatively cool plasma and 3) operates at atmospheric pressure so no vacuum equipment is needed.

SUMMARY OF THE INVENTION

The present invention provides various systems and methods for generating a relatively cool microwave plasma using atmospheric pressure. These systems have a low per unit cost and operate at atmospheric pressure with lower operational costs, lower power consumption and a short turnaround time for sterilization. A relatively cool microwave plasma is produced by nozzles which operate, unlike existing plasma generating systems, at atmospheric pressure with an enhanced operational efficiency.

As opposed to low pressure plasmas associated with vacuum chambers, atmospheric pressure plasmas offer a number of distinct advantages to users. Atmospheric pressure plasma systems use compact packaging which makes the system easily configurable and it eliminates the need for highly priced vacuum chambers and pumping systems. Also, atmospheric pressure plasma systems can be installed in a variety of environments without needing additional facilities, and their operating costs and maintenance requirements are minimal. In fact, the main feature of an atmospheric plasma sterilization system is its ability to sterilize heat-sensitive objects in a simple-to-use manner with faster turnaround cycles. Atmospheric plasma sterilization can achieve a direct effect of reactive neutrals, including atomic oxygen and hydroxyl radicals, and plasma generated UV light, all of which can attack and inflict damage to bacteria cell membranes. Thus, applicants recognized the need for devices that can generate an atmospheric pressure plasma as an effective and low-cost sterilization device.

According to one aspect of the present invention, a microwave plasma nozzle for generating plasma from microwaves and a gas is disclosed. The microwave plasma nozzle includes a gas flow tube for having a gas flow therethrough, where the gas flow tube has an outlet portion including a material that is substantially transparent to microwaves. The outlet portion refers to a section including the edge and a portion of the gas flow tube in proximity to the edge. The nozzle also includes a rod-shaped conductor disposed in the gas flow tube. The rod-shaped conductor can include a tapered tip disposed in proximity to the outlet portion of the gas flow tube. It is also possible to include a vortex guide disposed between the rod-shaped conductor and the gas flow tube. The vortex guide has at least one passage that is angled with respect to a longitudinal axis of the rod-shaped conductor for imparting a helical shaped flow direction around the rod-shaped conductor to a gas passing along the passage. It is possible to provide the passage or passages inside the vortex guide and/or the passage(s) can be a channel disposed on an outer surface of the vortex guide so that they are between the vortex guide and the gas flow tube.

According to another aspect of the present invention, a microwave plasma nozzle for generating plasma from microwaves and a gas comprises a gas flow tube for having a gas flow therethrough, a rod-shaped conductor disposed in the gas flow tube and a vortex guide disposed between the rod-shaped conductor and the gas flow tube. The rod-shaped conductor has a tapered tip disposed in proximity to the outlet portion of said gas flow tube. The vortex guide has at least one passage angled with respect to a longitudinal axis of the rod-shaped conductor for imparting a helical shaped flow direction around the rod-shaped conductor to a gas passing along the passage.

According to still another aspect of the present invention, an apparatus for generating plasma is provided. The apparatus comprises a microwave cavity having a wall forming a portion of a gas flow passage; a gas flow tube for having a gas flow therethrough, the gas flow tube having an inlet portion connected to the microwave cavity and the gas flow tube has an outlet portion including a dielectric material. The nozzle also includes a rod-shaped conductor disposed in the gas flow tube. The rod-shaped conductor has a tapered tip disposed in proximity to the outlet portion of the gas flow tube. A portion of the rod-shaped conductor is disposed in the microwave cavity and can receive microwaves passing therethrough. The microwave plasma nozzle can also include a means for reducing a microwave power loss through the gas flow tube. The means for reducing a microwave power loss can include a shield that is disposed adjacent to a portion of said gas flow tube. The shield can be supplied to the exterior and/or interior of the gas flow tube. The nozzle can also be provided with a grounded shield disposed adjacent to a portion of the gas flow tube. A shielding mechanism for reducing microwave loss through the gas flow tube can also be provided. The shielding mechanism may be an inner shield tube disposed within the gas flow tube or a grounded shield covering a portion of the gas flow tube.

According to yet another aspect of the present invention, a plasma generating system is disclosed. The plasma generating system comprises a microwave generator for generating microwave; a power supply connected to the microwave generator for providing power thereto; a microwave cavity having a wall forming a portion of a gas flow passage; a waveguide operatively connected to the microwave cavity for transmitting microwaves thereto; an isolator for dissipating microwaves reflected from the microwave cavity; a gas flow tube for having a gas flow therethrough, the gas flow tube having an outlet portion including a dielectric material, the gas flow tube also having an inlet portion connected to the microwave cavity; and a rod-shaped conductor disposed in the gas flow tube. The rod-shaped conductor has a tapered tip disposed in proximity to the outlet portion of the gas flow tube. A portion of the rod-shaped conductor is disposed in the microwave cavity for receiving or collecting microwaves. A vortex guide can also be disposed between the rod-shaped conductor and the gas flow tube. The vortex guide has at least one passage that is angled with respect to a longitudinal axis of the rod-shaped conductor for imparting a helical shaped flow direction around the rod-shaped conductor to a gas passing along the passage.

According to yet another aspect of the present invention, a method for generating plasma using microwaves is provided. The method comprises the steps of providing a microwave cavity; providing a gas flow tube operatively connected to the microwave cavity; providing a rod-shaped conductor having a tapered tip; disposing a first portion of the rod-shaped conductor adjacent an outlet portion of the gas flow tube and disposing a second portion of the rod-shaped conductor in the microwave cavity; providing a gas to the gas flow tube; transmitting microwaves to the microwave cavity; receiving the transmitted microwaves using at least the second portion of the rod-shaped conductor; and generating plasma using the gas and by using power from the transmitted microwaves.

These and other advantages and features of the invention will become apparent to those persons skilled in the art upon reading the details of the invention as more fully described below.

DETAILED DESCRIPTION OF THE PREFERRED EMBODIMENTS

Figure 1:
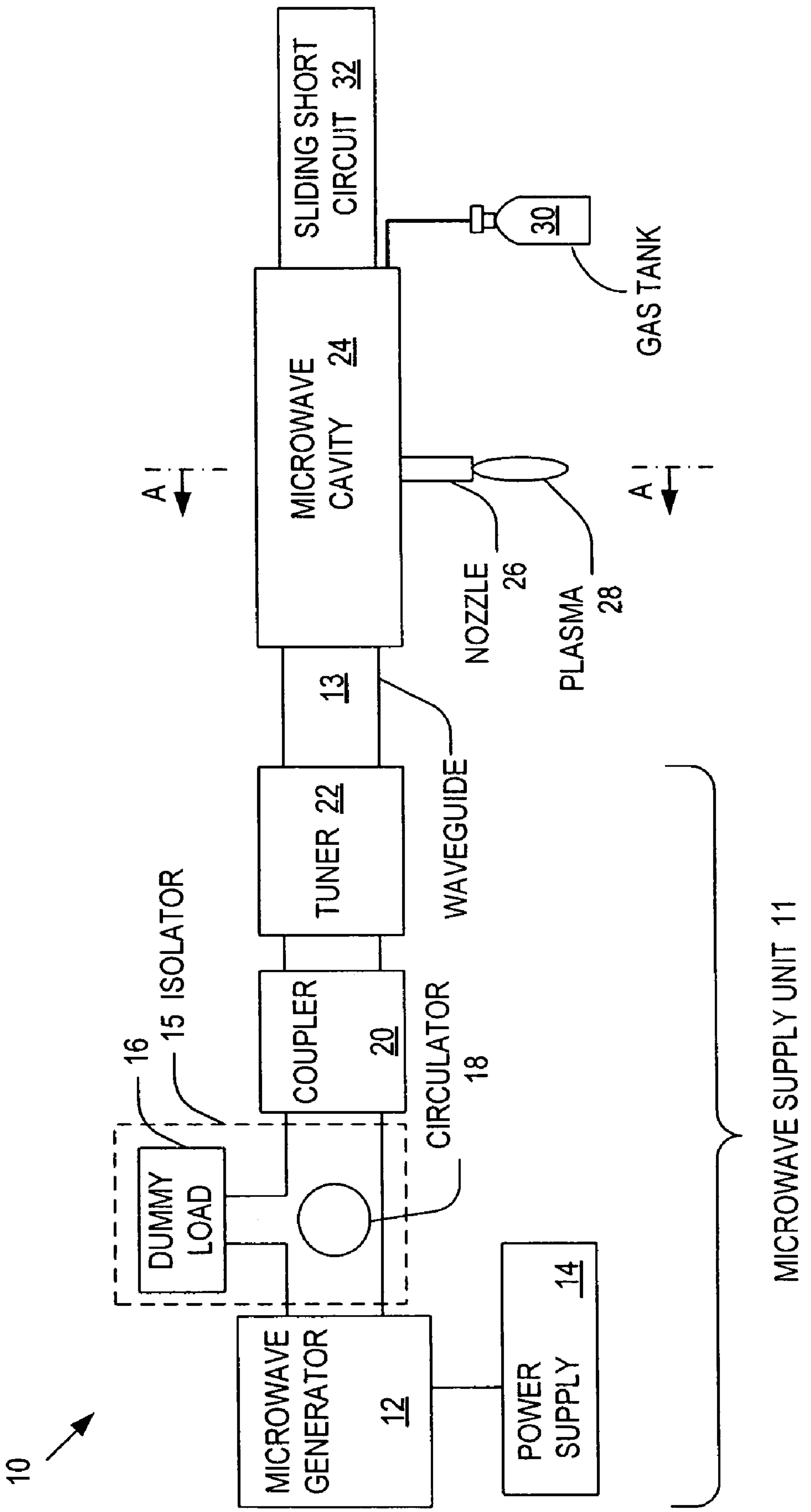
FIG. 1 is a schematic diagram of a plasma generating system in accordance with a first embodiment of the present invention.

FIG. 1 is a schematic diagram of a system 10 for generating microwave plasma in accordance with one embodiment of the present invention. As illustrated, the system 10 may include: a microwave cavity 24; a microwave supply unit 11 for providing microwaves to the microwave cavity 24; a waveguide 13 for transmitting microwaves from the microwave supply unit 11 to the microwave cavity 24; and a nozzle 26 connected to the microwave cavity 24 for receiving microwaves from the microwave cavity 24 and generating an atmospheric plasma 28 using a gas and/or gas mixture received from a gas tank 30. A commercially available sliding short circuit 32 can be attached to the microwave cavity 24 to control the microwave energy distribution within the microwave cavity 24 by adjusting the microwave phase.

The microwave supply unit 11 provides microwaves to the microwave cavity 24 and may include: a microwave generator 12 for generating microwaves; a power supply for supplying power to the microwave generator 14; and an isolator 15 having a dummy load 16 for dissipating reflected microwaves that propagates toward the microwave generator 12 and a circulator 18 for directing the reflected microwaves to the dummy load 16.

In one embodiment, the microwave supply unit 11 further includes a coupler 20 for measuring fluxes of the microwaves; and a tuner 22 for reducing the microwaves reflected from the microwave cavity 24. The components of the microwave supply unit 11 shown in FIG. 1 are well known and are listed herein for exemplary purposes only. Also, it is possible to replace the microwave supply unit 11 with a system having the capability to provide microwaves to the microwave cavity 24 without deviating from the present invention. Likewise, the sliding short circuit 32 may be replaced by a phase shifter that can be configured in the microwave supply unit 11. Typically, a phase shifter is mounted between the isolator 15 and the coupler 20.

Figure 2:
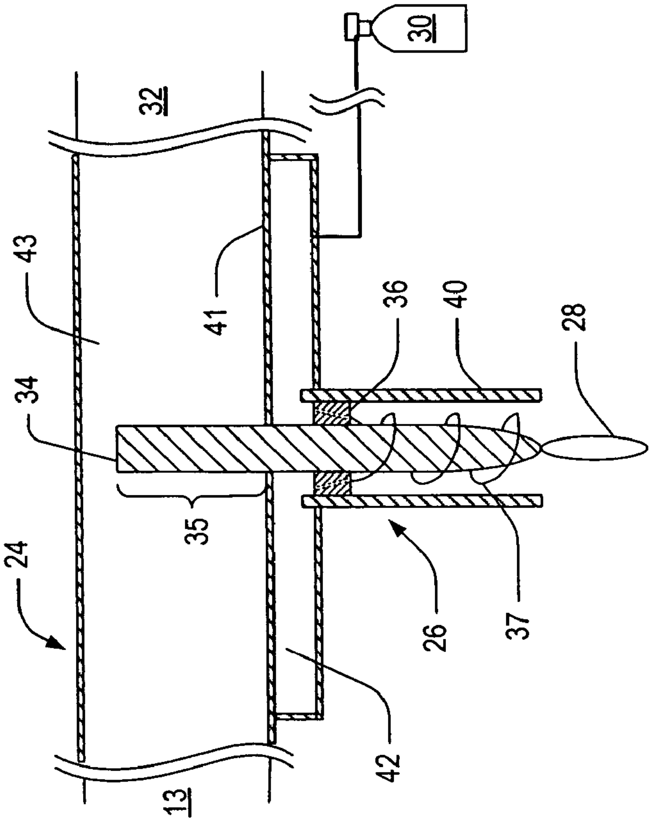
FIG. 2 is a partial cross-sectional view of the microwave cavity and nozzle taken along line A—A shown in FIG. 1.

FIG. 2 is a partial cross-sectional view of the microwave cavity 24 and the nozzle 26 taken along line A—A in FIG. 1. As shown in FIG. 2, the microwave cavity 24 includes a wall 41 that forms a gas channel 42 for admitting gas from the gas tank 30; and a cavity 43 for containing the microwaves transmitted from the microwave generator 12. The nozzle 26 includes a gas flow tube 40 sealed with the cavity wall or the structure forming the gas channel 42 for receiving gas therefrom; a rod-shaped conductor 34 having a portion 35 disposed in the microwave cavity 24 for receiving microwaves from within the microwave cavity 24; and a vortex guide 36 disposed between the rod-shaped conductor 34 and the gas flow tube 40. The vortex guide 36 can be designed to securely hold the respective elements in place.

At least some parts of an outlet portion of the gas flow tube 40 can be made from conducting materials. The conducting materials used as part of the outer portion of the gas flow tube will act as a shield and it will improve plasma efficiencies. The part of the outlet portion using the conducting material can be disposed, for example, at the outlet edge of the gas flow tube.

Figure 3:
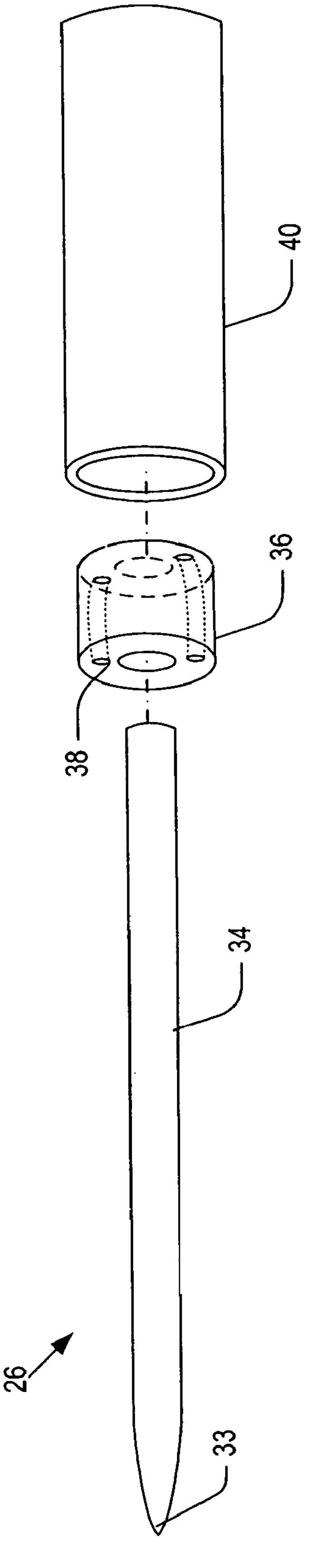
FIG. 3 is an exploded view of the gas flow tube, the rod-shaped conductor and the vortex guide according to the first embodiment of the present invention.

FIG. 3 is an exploded view of the nozzle 26. As shown in FIG. 3, a rod-shaped conductor 34 and a gas flow tube 40 can engage the inner and outer perimeters of the vortex guide 36, respectively. The rod-shaped conductor 34 acts as an antenna to collect microwaves from the microwave cavity 24 and focuses the collected microwaves to a tapered tip 33 to generate plasma 28 using the gas flowing through the gas flow tube 40. The rod-shaped conductor 34 may be made of any material that can conduct microwaves. The rod-shaped conductor 34 can be made out of copper, aluminum, platinum, gold, silver and other conducting materials. The term rod-shaped conductor is intended to cover conductors having various cross sections such as a circular, oval, elliptical, or an oblong cross section or combinations thereof. It is preferred that the rod-shaped conductor not have a cross section such that two portions thereof meet to form an angle (or sharp point) as the microwaves will concentrate in this area and decrease the efficiency of the device.

The gas flow tube 40 provides mechanical support for the overall nozzle 26 and may be made of any material that microwaves can pass through with very low loss of energy (substantially transparent to microwaves). Preferably, the material is a conventional dielectric material such as glass or quartz but it is not limited thereto.

The vortex guide 36 has at least one passage or channel 38. The passage 38 (or passages) imparts a helical shaped flow direction around the rod-shaped conductor 34 to the gas flowing through the tube as shown in FIG. 2. A gas vortex flow path 37 allows for an increased length and stability of the plasma 28. It also allows for the conductor to be a shorter length than would otherwise be required for producing plasma. In one embodiment, the vortex guide 37 may be made of a ceramic material. The vortex guide 37 can be made out of any non-conducting material that can withstand exposure to high temperatures. Preferably, a high temperature plastic that is also a microwave transparent material is used for the vortex guide 37.

In FIG. 3, each through-pass hole or passage 38 is schematically illustrated as being angled to the longitudinal axis of the rod-shaped conductor and can be shaped so that a helical or spiral flow would be imparted to the gas flowing through the passage or passages. However, the passage or passages may have other geometric flow path shapes as long as the flow path causes a swirling flow around the rod-shaped conductor.

Figure 4C:
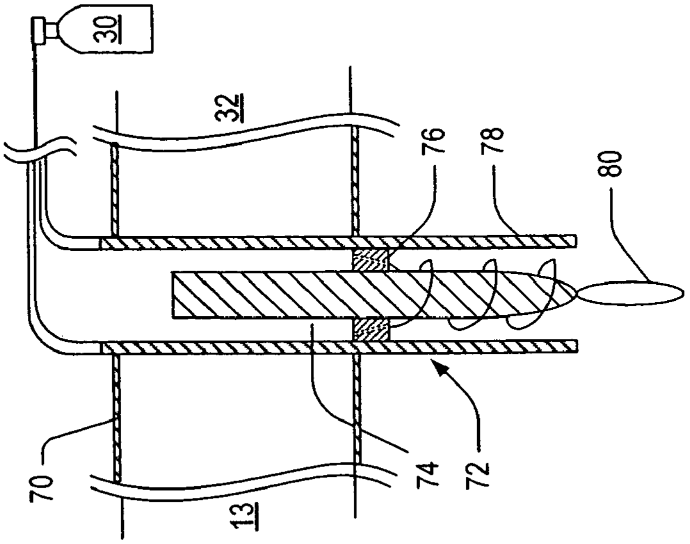
FIGS. 4A–4C are partial cross-sectional views of alternative embodiments of the microwave cavity and nozzle.
Figure 4B:
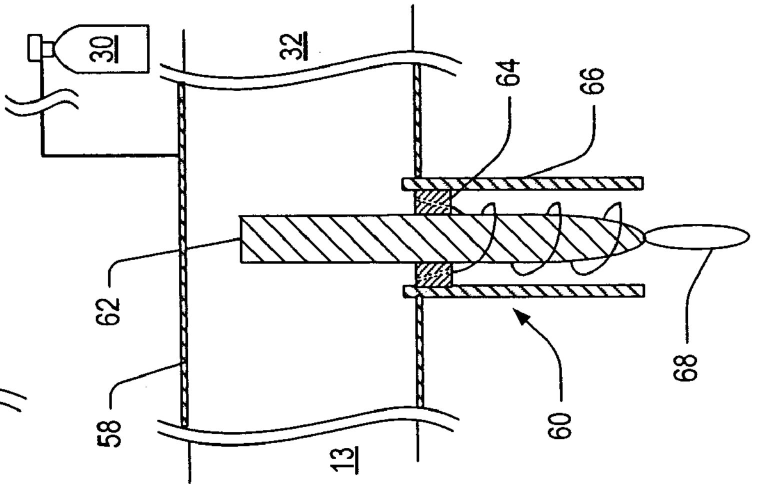
Figure 4A:
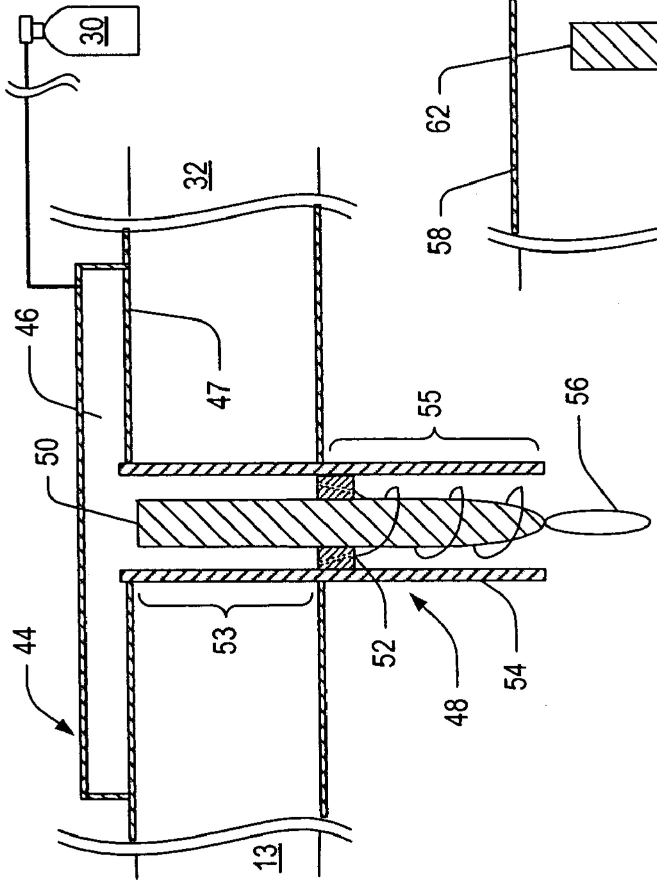

Referring back to FIG. 2, the microwave cavity wall 41 forms a gas channel for admitting gas from the gas tank 30. The inlet portion of the gas flow tube 40 is connected to a portion of the wall 41. FIGS. 4A–4C illustrate various embodiments of the gas feeding system shown in FIG. 2, which have components of that are similar to their counterparts in FIG. 2.

FIG. 4A is a partial cross-sectional view of an alternative embodiment of the microwave cavity and nozzle arrangement shown in FIG. 2. In this embodiment, a microwave cavity 44 has a wall 47 forming a gas flow channel 46 connected to gas tank 30. The nozzle 48 includes a rod-shaped conductor 50, a gas flow tube 54 connected to microwave cavity wall 46, and a vortex guide 52. In this embodiment, the gas flow tube 54 may be made of any material that allows microwaves to pass through with a very low loss of energy. As a consequence, the gas flowing through the gas flow tube 54 may be pre-heated within the microwave cavity 44 prior to reaching the tapered tip of the rod-shaped conductor 50. In a first alternative embodiment, a upper portion 53 of the gas flow tube 54 may be made of a material substantially transparent to microwaves such as a dielectric material, while the other portion 55 may be made of conducting material with the outlet portion having a material substantially transparent to microwaves.

In a second alternative embodiment, the portion 53 of the gas flow tube 54 may be made of a dielectric material, and the portion 55 may include two sub-portions: a sub-portion made of a dielectric material near the outlet portion of the gas flow tube 54 and a sub-portion made of a conducting material. In a third alternative embodiment, the portion 53 of the gas flow tube 54 may be made of a dielectric material, and the portion 55 may include two sub-portions: a sub-portion made of a conducting material near the outlet portion of the gas flow tube 54 and a sub-portion made of a dielectric material. As in the case of FIG. 2, the microwaves received by a portion of the rod-shaped conductor 50 are focused on the tapered tip to heat the gas into plasma 56.

FIG. 4B is a partial cross-sectional view of another embodiment of the microwave cavity and nozzle shown in FIG. 2. In FIG. 4B, the entire microwave cavity 58 forms a gas flow channel connected to the gas tank 30. The nozzle 60 includes a rod-shaped conductor 62, a gas flow tube 66 connected to a microwave cavity 58, and a vortex guide 64. As in the case of FIG. 2, the microwaves collected by a portion of the rod-shaped conductor 62 are focused on the tapered tip to heat the gas into plasma 68.

FIG. 4C is a partial cross-sectional view of yet another embodiment of the microwave cavity and nozzle shown in FIG. 2. In FIG. 4C, a nozzle 72 includes a rod-shaped conductor 74, a gas flow tube 78 connected to gas tank 30, and a vortex guide 76. In this embodiment, unlike the systems of FIGS. 4A–4B, a microwave cavity 70 is not directly connected to gas tank 30. The gas flow tube 78 may be made of a material that is substantially transparent to microwave so that the gas may be pre-heated within the microwave cavity 70 prior to reaching the tapered tip of rod-shaped conductor 74. As in the case of FIG. 2, the microwaves collected by a portion of the rod-shaped conductor 74 are focused on the tapered tip to heat the gas into plasma 80. In this embodiment, the gas flow from tank 30 passes through the gas flow tube 78 which extends through the microwave cavity. The gas then flows through the vortex guide 76 and it is heated into plasma 80 near the tapered tip.

As illustrated in FIG. 2, a portion 35 of the rod-shaped conductor 34 is inserted into the cavity 43 to receive and collect the microwaves. Then, these microwaves travel along the surface of the conductor 34 and are focused at the tapered tip. Since a portion of the traveling microwaves may be lost through the gas flow tube 40, a shielding mechanism may be used to enhance the efficiency and safety of the nozzle, as shown in FIGS. 5A–5B.

Figures 5A, 5B, 5C, 5D, 5E, 5F:
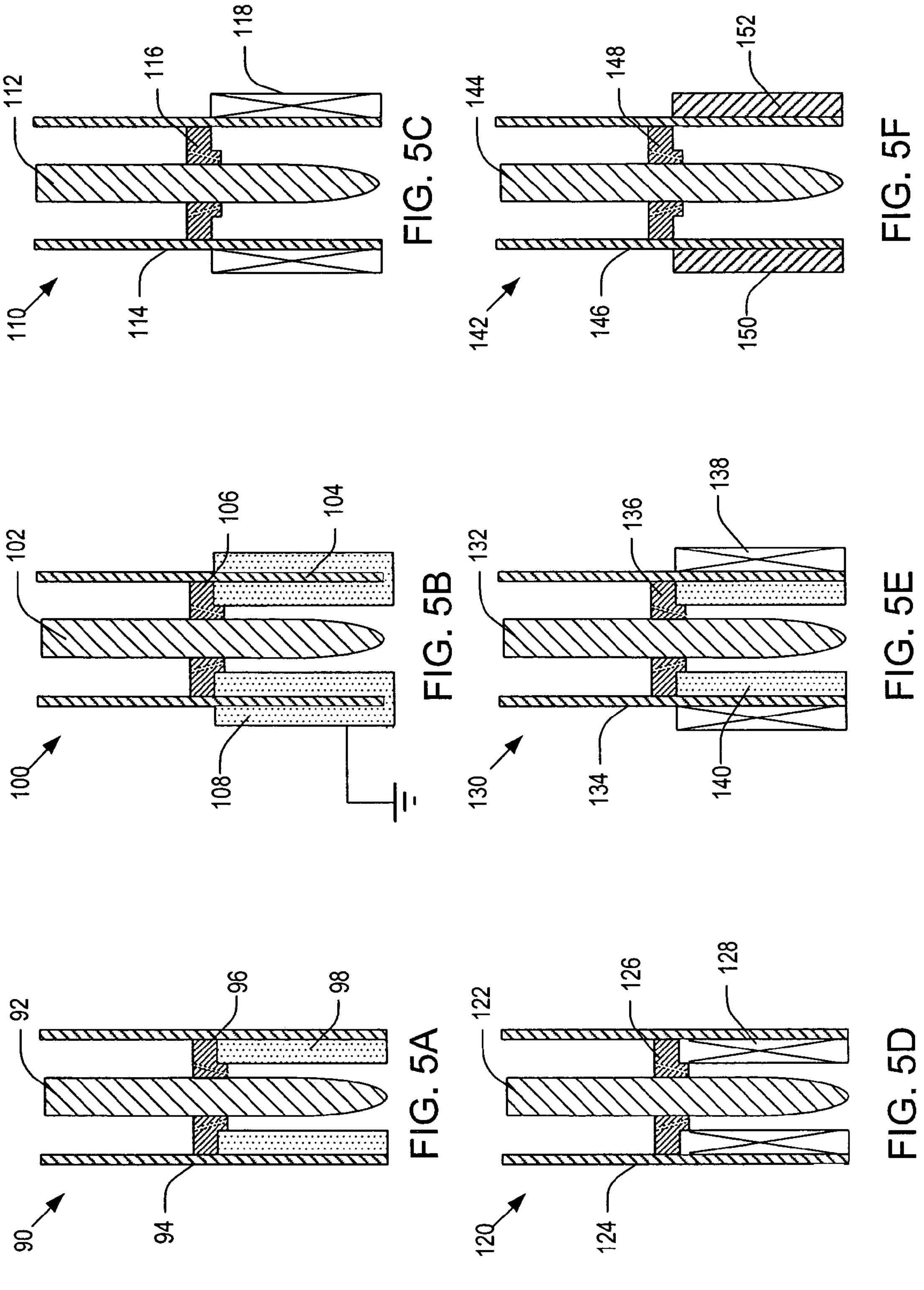
FIGS. 5A–5F are cross-sectional views of alternative embodiments of the gas flow tube, the rod-shaped conductor and the vortex guide shown in FIG. 2, which include additional components that enhance nozzle efficiency.

FIG. 5A is a cross-sectional view of an alternative embodiment of the nozzle 40 shown in FIG. 2. As illustrated in FIG. 5A, a nozzle 90 includes a rod-shaped conductor 92, a gas flow tube 94, a vortex guide 96, and an inner shield 98 for reducing a microwave power loss through gas flow tube 94. In one embodiment, an inner shield 98 has a tubular shape and can be disposed in a recess formed along the outer perimeter of the vortex guide 96. The inner shield 98 provides additional control of the helical flow direction around the rod-shaped conductor 92 and increases the stability of the plasma by changing the gap between the gas flow tube 94 and the rod-shaped conductor 92.

FIG. 5B is a cross-sectional view of another embodiment of the nozzle 40 shown in FIG. 2. As illustrated in FIG. 5B, a nozzle 100 includes a rod-shaped conductor 102, a gas flow tube 104, a vortex guide 106 and a grounded shield 108 for reducing a microwave power loss through the gas flow tube 104. A grounded shield 108 can cover a portion of gas flow tube 104. Like the inner shield 98, the grounded shield 108 can provide additional control of helical flow direction around the rod-shaped conductor 102 and can increase the plasma stability by changing the gap between gas flow tube 104 and rod-shaped conductor 102.

The main heating mechanism applied to the nozzles shown in FIGS. 2 and 4A–4C is the microwaves that are focused and discharged at the tapered tip of the rod-shaped conductor, where the nozzles can produce non-LTE plasmas for sterilization. In one embodiment, the temperature of the ions and the neutral species in non-LTE plasmas can be less than 100° C., while the temperature of electrons can be up to several tens of thousand degrees in Celsius. To enhance the electron temperature and increase the nozzle efficiency, the nozzles can include additional mechanisms that electronically excite the gas while the gas is within the gas flow tube, as illustrated in FIGS. 5C–F.

FIG. 5C is a cross-sectional view of yet another embodiment of the nozzle. As illustrated in FIG. 5C, a nozzle 110 includes a rod-shaped conductor 112, a gas flow tube 114, a vortex guide 116, and a pair of outer magnets 118 for electronic excitation of the gas flowing in gas flow tube 114. In one embodiment, each of the pair of outer magnets 118 may be shaped as a portion of a cylinder having, for example, a semicircular cross section disposed around the outer surface of the gas flow tube 114.

FIG. 5D is a cross-sectional view of still another embodiment of the nozzle 120. As shown in FIG. 5D, the nozzle 120 includes a rod-shaped conductor 122, a gas flow tube 124, a vortex guide 126, and a pair of inner magnets 128 that are secured by the vortex guide 126 within the gas flow tube 124 for electronic excitation of the gas flowing in gas flow tube 124. In one embodiment, each of the pair of inner magnets 128 may be shaped as a portion of a cylinder having, for example, a semicircular cross section.

FIG. 5E is a cross-sectional view of still another embodiment of the nozzle structure. As shown in FIG. 5E, a nozzle 130 includes a rod-shaped conductor 132, a gas flow tube 134, a vortex guide 136, a pair of outer magnets 138, and an inner shield 140. In one embodiment, each of the outer magnets 118 may be shaped as a portion of a cylinder having, for example, a semicircular cross section. In another embodiment, the inner shield 140 may have a tubular shape.

FIG. 5F is a cross-sectional view of another embodiment of the nozzle structure. As illustrated in FIG. 5F, a nozzle 142 includes a rod-shaped conductor 144, a gas flow tube 146, a vortex guide 148, an anode 150, and a cathode 152. The anode 150 and the cathode 152 are connected to an electrical power source (not shown for simplicity). This arrangement allows the anode 150 and the cathode 152 to electronically excite the gas flowing in gas flow tube 146. The anode and the cathode generate an electromagnetic field which charges the gas as it passes through the magnetic field. This allows that plasma to have a higher energy potential and this improves the mean life span of the plasma.

FIGS. 5A–5F are cross-sectional views of various embodiments of the nozzle. It should be understood that the various alternative embodiments shown in FIGS. 5A–5F can also be applied as the various nozzles shown in FIGS. 4A–4C.

Figure 6A:
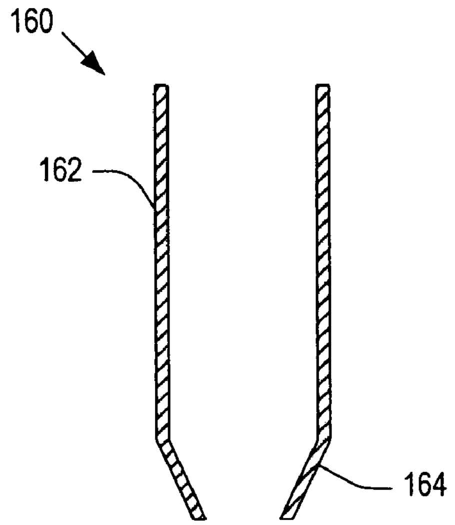
FIGS. 6A–6B are cross-sectional views of alternative embodiments of the gas flow tube shown in FIG. 2, which include two different geometric shapes of the outlet portion of the gas flow tube.
Figure 6B:
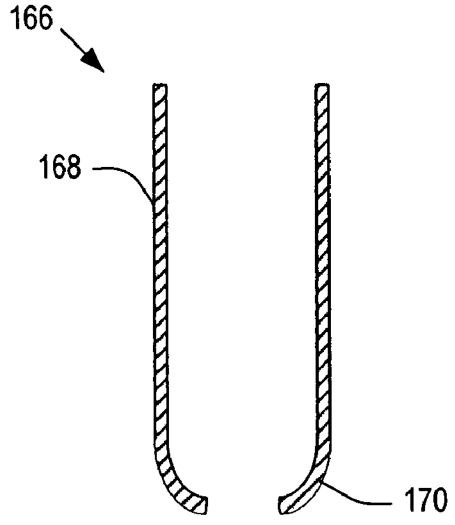

Referring back to FIGS. 2–3, the gas flow tube 40 is described as a straight tube. However, the cross-section of gas flow tube 40 may change along its length to direct the helical flow direction 37 toward the tapered tip 33, as shown in FIGS. 6A–6B. FIG. 6A is a cross-sectional view of an alternative embodiment of a gas flow tube 160, where the gas flow tube 160 has a straight section 162 and a frusto-conical section 164. FIG. 6B is a cross-sectional view of another embodiment of the gas flow tube 166, where the gas flow tube 166 has a straight section 168 and a curved section such as for example, a bell-shaped section 170.

Figure 7A:
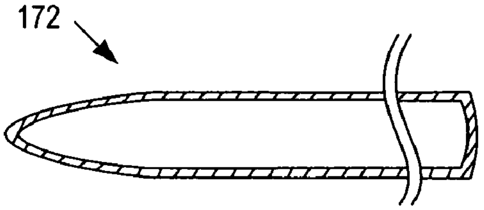
FIGS. 7A–7E are cross-sectional views of alternative embodiments of the rod-shaped conductor.

As illustrated in FIG. 2, the microwaves are received by a collection portion 35 of the rod-shaped conductor 34 extending into the microwave cavity 24. These microwaves travel down the rod-shaped conductor toward the tapered tip 33. More specifically, the microwaves are received by and travel along the surface of the rod-shaped conductor 34. The depth of the skin responsible for microwave penetration and migration is a function of the microwave frequency and the conductor material. The microwave penetration distance can be less than a millimeter. Thus, a rod-shaped conductor 172 of FIG. 7A having a hollow portion 173 is an alternative embodiment for the rod-shaped conductor.

Figure 7B:
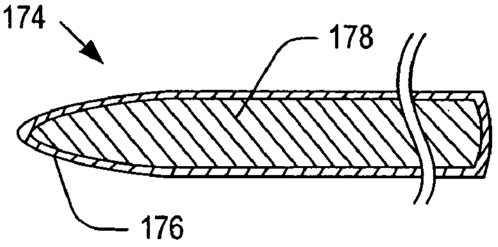

It is well known that some precious metals are good microwave conductors. Thus, to reduce the unit price of the device without compromising the performance of the rod-shaped conductor, the skin layer of the rod-shaped conductor can be made of precious metals that are good microwave conductors while cheaper conducting materials can be used for inside of the core. FIG. 7B is a cross-sectional view of another embodiment of a rod-shaped conductor, wherein a rod-shaped conductor 174 includes skin layer 176 made of a precious metal and a core layer 178 made of a cheaper conducting material.

Figure 7C:
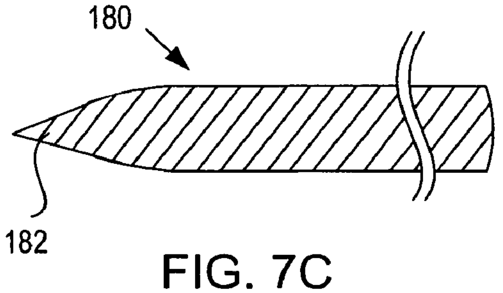

FIG. 7C is a cross-sectional view of yet another embodiment of the rod-shaped conductor, wherein a rod-shaped conductor 180 includes a conically-tapered tip 182. Other cross-sectional variations can also be used. For example, conically-tapered tip 182 may be eroded by plasma faster than another portion of rod-conductor 180 and thus may need to be replaced on a regular basis.

Figure 7D:
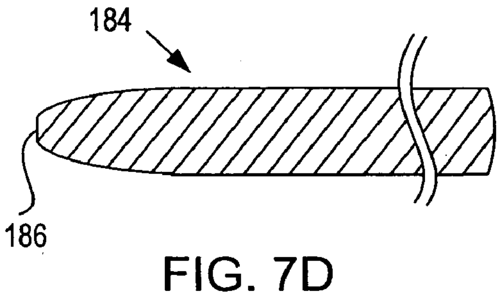

FIG. 7D is a cross-sectional view of one embodiment of the rod-shaped conductor, wherein a rod-shaped conductor 184 has a blunt-tip 186 instead of a pointed tip to increase the lifetime thereof.

Figure 7E:
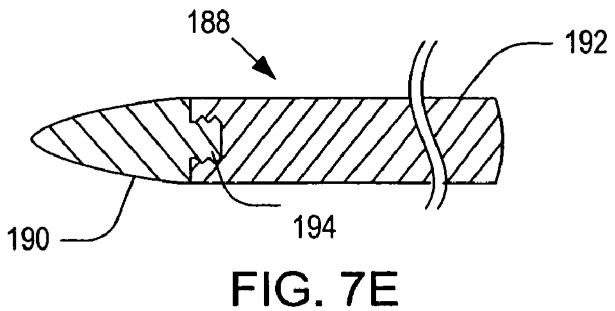

FIG. 7E is a cross-sectional view of another embodiment of the rod-shaped conductor, wherein a rod-shaped conductor 188 has a tapered section 190 secured to a cylindrical portion 192 by a suitable fastening mechanism 194 (in this case, the tapered section 190 can be screwed into the cylindrical portion 192 using the screw end 194) for easy and quick replacement thereof.

Also, it is well known that microwaves are focused on sharp points or corners. Thus, it is important that the surface of a rod-shaped conductor has smooth curves in the region of the tip where the microwaves are focused and dissipated.

Figure 8:
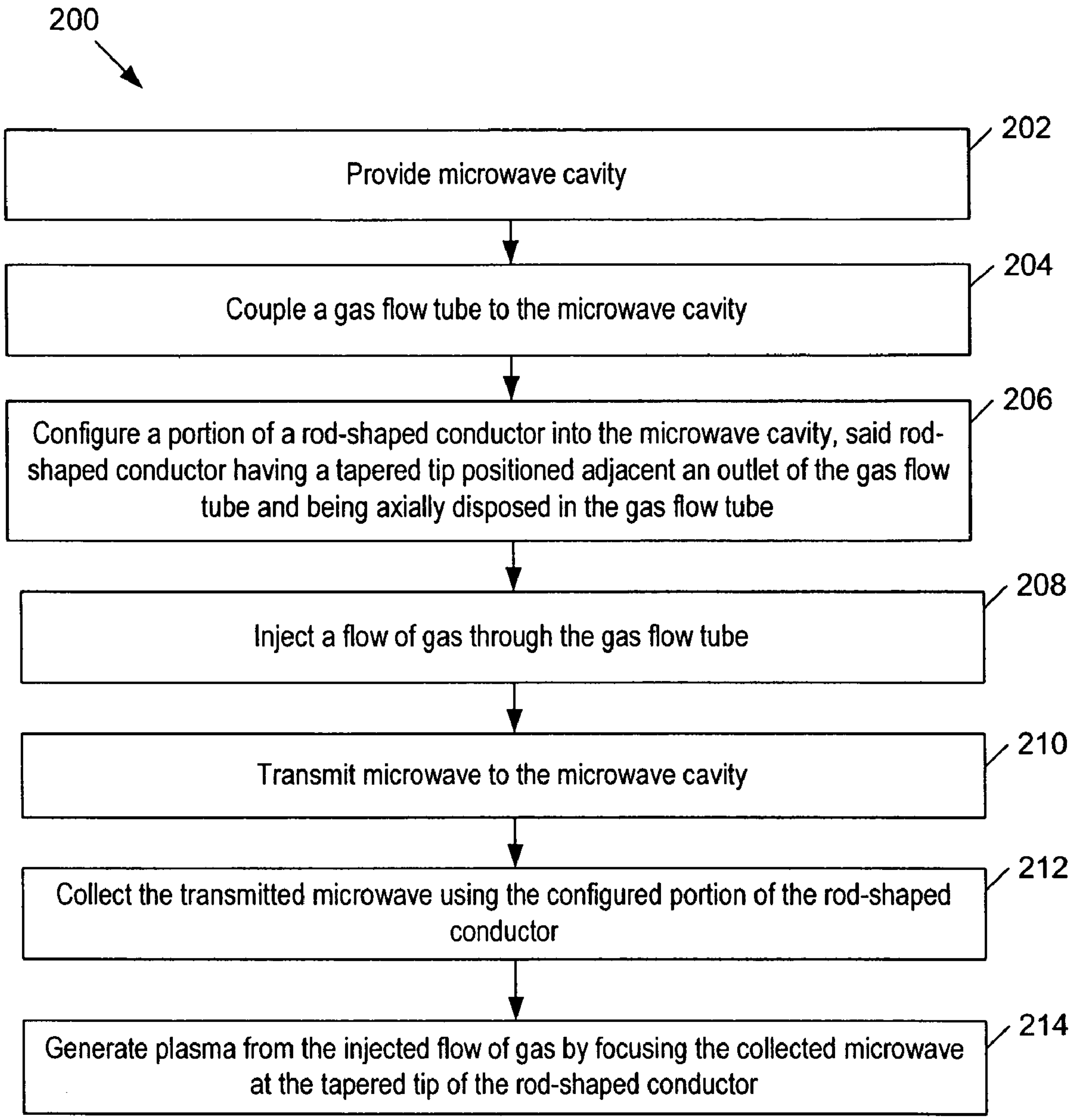
FIG. 8 shows a flow chart illustrating the exemplary steps for generating microwave plasma using the system shown in FIG. 1 in accordance with an embodiment of the present invention

FIG. 8 shows a flowchart 200 showing an example of the steps that may be taken as an approach to generate microwave plasma using the system shown in FIG. 1. In steps 202 and 204, a microwave cavity, a gas flow tube and a rod-shaped conductor are provided. Next, a portion of the rod-shaped conductor is configured into the microwave cavity, where the rod-shaped conductor has a tapered tip near the outlet of the gas flow tube and is disposed in the gas flow tube at step 206. Then, in step 208, a gas is injected into the gas flow tube and, in step 210, microwaves are transmitted to the microwave cavity. Next, the transmitted microwaves are received by the configured portion of the rod-shaped conductor in step 212. Consequently, the collected microwave is focused at the tapered tip of the rod-shaped conductor to heat the gas into plasma in step 214.

While the present invention has been described with reference to the specific embodiments thereof, it should be understood that the foregoing relates to preferred embodiments of the invention and that modifications may be made without departing from the spirit and scope of the invention as set forth in the following claims.

We claim:

1. A microwave plasma nozzle for generating plasma from microwaves and a gas, comprising:

a gas flow tube for having a gas flow therethrough, said gas flow tube having an outlet portion made of a material that is substantially transparent to microwaves; and a rod-shaped conductor disposed in said gas flow tube and operative to transmit microwaves along the surface thereof, said rod-shaped conductor having first and second ends, said first end including a tapered tip disposed in proximity to and surrounded by said outlet portion of said gas flow tube, said outlet portion of said gas flow tube having an open end opening around a distal end of the tip, wherein said microwaves transmitted along the surface heat up the gas flow to generate plasma at said tapered tip.

2. A microwave plasma nozzle as defined in claim 1, further comprising:

a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to a gas passing along said at least one passage.

3. A microwave plasma nozzle as defined in claim 1, wherein said rod-shaped conductor has a circular cross-section.

4. A microwave plasma nozzle as defined in claim 1, wherein said outlet portion of said gas flow tube is made of a material that is substantially transparent to microwaves and said gas flow tube has an upper portion made of a material that is substantially transparent to microwaves, and an intermediate portion made of a conducting material located between the outlet portion and the upper portion.

5. A microwave plasma nozzle as defined in claim 1, wherein the material that is substantially transparent to microwaves is a dielectric material.

6. A microwave plasma nozzle as defined in claim 1, further comprising:

a shield disposed within a portion of said gas flow tube for reducing a microwave power loss through said gas flow tube.

7. A microwave plasma nozzle as defined in claim 6, wherein said shield includes a conducting material.

8. A microwave plasma nozzle as defined in claim 1, further comprising:

a grounded shield having a portion disposed within said gas flow tube and configured to reduce a microwave power loss through said gas flow tube.

9. A microwave plasma nozzle as defined in claim 1, further comprising:

a microwave cavity, said second end of said rod-shaped conductor being disposed in the microwave cavity and operative to collect microwaves from the microwave cavity.

10. A microwave plasma nozzle as defined in claim 1, wherein said rod-shaped conductor has a cross-sectional shape of at least one of oval, elliptical and oblong.

11. A microwave plasma nozzle for generating plasma from microwaves and a gas, comprising:

a gas flow tube for having a gas flow therethrough, said gas flow tube having an outlet portion made of a material that is substantially transparent to microwaves;

a rod-shaped conductor disposed in said gas flow tube and operative to transmit microwaves along the surface thereof, said rod-shaped conductor having first and second ends, said first end including a tapered tip disposed in proximity to and surrounded by said outlet portion of said gas flow tube; and a microwave cavity, said second end of said rod-shaped conductor being disposed in the microwave cavity and operative to collect microwaves from the microwave cavity, wherein said microwaves transmitted along the surface of said rod-shaped conductor heat up the gas flow to generate plasma at said tapered tip, and said microwave cavity includes a wall, said wall of said microwave cavity forming a portion of a gas flow passage operatively connected to an inlet portion of said gas flow tube.

12. A microwave plasma nozzle for generating plasma from microwaves and a gas, comprising:

a gas flow tube for having a gas flow theretrough, said gas flow tube having an outlet portion made of a material that is substantially transparent to microwaves;

a rod-shaped conductor disposed in said gas flow tube and operative to transmit microwaves along the surface thereof, said rod-shaped conductor having first and second ends, said first end including a tapered tip disposed in proximity to and surrounded by said outlet portion of said gas flow tube, wherein said microwaves transmitted along the surface heat up the gas flow to generate plasma at said tapered tip; and a microwave cavity for transmitting source microwaves therethrough, said second end portion of said rod-shaped conductor being disposed in the microwave cavity and operative to collect a portion of the source microwaves, a portion of said microwave cavity forming a gas flow passage and being operatively connected to an inlet portion of said gas flow tube.

13. A microwave plasma nozzle for generating plasma from microwaves and a gas, comprising:

a gas flow tube for having a gas flow therethrough, said gas flow tube having an outlet portion made of a material that is substantially transparent to microwaves;

a rod-shaped conductor disposed in said gas flow tube and operative to transmit microwaves along the surface thereof, said rod-shaped conductor having first and second ends, said first end including a tapered tip disposed in proximity to and surrounded by said outlet portion of said gas flow tube, said outlet portion of said gas flow tube having an open end opening around a distal end of the tip; and a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to a gas passing along said at least one passage, wherein the microwaves transmitted along the surface heat up the gas flow to generate plasma at said tapered tip.

14. A microwave plasma nozzle as defined in claim 13, further comprising means for reducing a microwave power loss through said gas flow tube, a portion of said means being positioned within said gas flow tube.

15. A microwave plasma nozzle as defined in claim 14, wherein said means is grounded.

16. A microwave plasma nozzle as defined in claim 13, further comprising a grounded shield having a portion disposed within said gas flow tube.

17. A microwave plasma nozzle as defined in claim 13, further comprising means for electronically exciting a gas that passes through said gas flow tube.

18. A plasma generating system, comprising:

a microwave cavity having a wall forming a portion of a gas flow passage;

a gas flow tube for having a gas flow therethrough, said gas flow tube having an outlet portion made of a material that is substantially transparent to microwaves, said gas flow tube having an inlet portion connected to said portion of the gas flow passage to receive the gas flow from the microwave cavity; and a rod-shaped conductor disposed in said gas flow tube, said rod-shaped conductor having first and second end portions, said first end portion including a tapered tip disposed in proximity to said outlet portion of said gas flow tube, said second end portion of said rod-shaped conductor being disposed in said microwave cavity and operative to collect microwaves, wherein the microwaves collected by said second end portion heat up the gas flow to generate plasma at the tapered tip.

19. A plasma generating system as defined in claim 18, further comprising means for reducing a microwave power loss while microwaves are transmitted through said gas flow tube, said means having a portion disposed within the gas flow tube.

20. A plasma generating system as defined in claim 18, further comprising a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to a gas passing along said at least one passage.

21. A plasma generating system as defined in claim 18, further comprising a shield disposed within a portion of said gas flow tube.

22. A plasma generating system as defined in claim 18, further comprising a grounded shield having a portion disposed within said gas flow tube and configured to reduce a microwave power loss through said gas flow tube.

23. A plasma generating system as defined in claim 18, further comprising means for electronically exciting a gas that passes through said gas flow tube.

24. A plasma generating system, comprising:

a microwave generator for generating microwave;

a power supply connected to said microwave generator for providing power thereto;

a microwave cavity having a wall forming a portion of a gas flow passage;

a waveguide operatively connected to said microwave cavity for transmitting microwaves thereto from said microwave generator;

an isolator for dissipating microwaves reflected from said microwave cavity;

a gas flow tube for having a gas flow therethrough, said gas flow tube having an outlet portion made of a material that is substantially transparent to microwaves, said gas flow tube having an inlet portion connected to the gas flow passage of said microwave cavity; a rod-shaped conductor disposed in said gas flow tube, said rod-shaped conductor having first and second end portions, said first end portion including a tapered tip disposed in proximity to said outlet portion of said gas flow tube, said second end portion of said rod-shaped conductor being disposed in said microwave cavity and operative to collect microwaves; and a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to a gas passing along said at least one passage.

25. A plasma generating system as defined in claim 24, wherein said isolator includes:

a dummy load for dissipating microwaves; and a circulator attached to said dummy load for directing the microwaves reflected from said microwave cavity to said dummy load.

26. A plasma generating system as defined in claim 24, further comprising a shield that includes a portion disposed within said gas flow tube.

27. A plasma generating system as defined in claim 26, wherein said shield is grounded.

28. A plasma generating system as defined in claim 24, further comprising:

a phase shifter for controlling a phase of microwaves within said microwave cavity.

29. A plasma generating system as defined in claim 28, wherein said phase shifter is a sliding short circuit.

30. A plasma generating system defined in claim 24, further comprising means for electronically exciting a gas that passes through said gas flow tube.

31. A method for generating plasma using microwaves, said method comprising the steps of:

providing a microwave cavity that has a wall forming a gas flow passage;

providing a gas flow tube operatively connected to the gas flow passage of the microwave cavity, said gas flow tube having an outlet portion made of a material that is substantially transparent to microwaves;

providing a rod-shaped conductor having first and second end portions, said first end portion including a tapered tip;

disposing said tapered tip of the rod-shaped conductor in proximity to the outlet portion of the gas flow tube and disposing said second end portion of the rod-shaped conductor in the microwave cavity;

providing a gas to the gas flow tube via said gas flow passage;

transmitting microwaves to the microwave cavity;

collecting the transmitted microwaves using said second end portion of the rod-shaped conductor; and generating plasma using the gas provided in said step of providing a gas to the gas flow tube and using the microwaves received in said step of collecting.

32. A method for generating plasma as defined in claim 31, further comprising the step of:

electronically exciting the gas provided in said step of providing a gas to the gas flow tube, prior to said step of generating plasma.

33. A method for generating plasma as defined in claim 31, further comprising the step of:

disposing a portion of a means for reducing a microwave power loss through the gas flow tube within said gas flow tube, prior to said step of generating plasma.

34. A method for generating plasma as defined in claim 31, further comprising the step of:

imparting a helical shaped flow direction around the rod-shaped conductor to the gas provided in said step of providing a gas to the gas flow tube.

35. A method for generating plasma, comprising:

providing a microwave cavity;

providing a gas flow tube operatively connected to the microwave cavity;

providing a rod-shaped conductor having a tapered tip;

disposing a first portion of the rod-shaped conductor adjacent an outlet portion of the gas flow tube and disposing a second portion of the rod-shaped conductor in the microwave cavity;

providing a gas to the gas flow tube;

transmitting microwaves to the microwave cavity;

receiving the transmitted microwaves using at least the second portion of the rod-shaped conductor; and generating plasma using the gas provided in said step of providing a gas to the gas flow tube and using the microwaves received in said step of receiving, wherein the step of providing a gas to the gas flow tube includes the steps of:

providing a gas flow passage in a wall of the microwave cavity;

connecting an inlet portion of the gas flow tube to the gas flow passage provided in said step of providing a gas flow passage in a wall of the microwave cavity; and providing the gas to the gas flow passage.

36. A microwave plasma nozzle unit for generating plasma, comprising:

a gas flow tube for having a gas flow therethrough, said gas flow tube having an outlet portion made of a non-conducting material; and a rod-shaped conductor disposed in said gas flow tube, said rod-shaped conductor having first and second ends, said first end including a tapered tip disposed in proximity to said outlet portion of said gas flow tube, said outlet portion of said gas flow tube having an open end opening around a distal end of the tip; and a microwave cavity for containing microwaves therein, said second end being positioned within said microwave cavity and operative to collect a portion of the microwaves contained in the microwave cavity, wherein the portion of the microwaves collected by the second end heat up the gas flow to generate plasma at the tapered tip.

37. A microwave plasma nozzle unit as defined in claim 36, wherein said outlet portion of said gas flow tube is made of a material that is transparent to microwaves, and a portion of said gas flow tube extending from the outlet portion is made of a conducting material.

38. A microwave plasma nozzle for generating plasma from microwaves and a gas, comprising:

a gas flow tube for having a gas flow therethrough, said gas flow tube having a portion including a conducting material;

a rod-shaped conductor disposed in said gas flow tube, said rod-shaped conductor having a tapered tip disposed in proximity to an outlet portion of said gas flow tube; and a shield having a portion disposed on an inner surface of said gas flow tube.

* * * * *